United States Patent
Arai et al.

(10) Patent No.: US 6,893,771 B2
(45) Date of Patent: May 17, 2005

(54) BATTERY ASSEMBLY

(75) Inventors: Naoto Arai, Osaka (JP); Shinji Hamada, Aichi (JP); Munehisa Ikoma, Aichi (JP); Masayoshi Iwase, Aichi (JP); Tomokazu Yamauchi, Aichi (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 280 days.

(21) Appl. No.: 09/842,573

(22) Filed: Apr. 25, 2001

(65) Prior Publication Data

US 2002/0006541 A1 Jan. 17, 2002

(30) Foreign Application Priority Data

Apr. 28, 2000 (JP) .................................... 2000-131760

(51) Int. Cl.$^7$ ......................... H01M 2/12; H01M 10/52
(52) U.S. Cl. .......................... 429/53; 429/72; 429/73; 429/177; 429/61
(58) Field of Search .......................... 429/225, 96, 82, 429/48, 72, 73, 175, 163, 178, 176, 177, 186, 53, 56, 61, 60, 99, 100, 54, 120, 158, 159

(56) References Cited

U.S. PATENT DOCUMENTS 5,209,759 A    5/1993  Suzuki et al.
5,558,950 A  *  9/1996  Ovshinsky et al. ......... 429/101
5,663,008 A  *  9/1997  Shimakawa et al. ......... 429/43
5,780,180 A  *  7/1998  Okamoto et al. ........... 429/175
5,879,831 A  *  3/1999  Ovshinsky et al. .......... 429/54
6,432,582 B1 *  8/2002  Holden et al. .............. 429/225

FOREIGN PATENT DOCUMENTS

EP              0 504 472 A2     8/1991
JP              4-294058         10/1992

* cited by examiner

*Primary Examiner*—Frankie L. Stinson
*Assistant Examiner*—Monique Wills
(74) *Attorney, Agent, or Firm*—Merchant & Gould P.C.

(57) ABSTRACT

A battery assembly includes a plurality of battery modules electrically connected together, each battery module acting as a secondary battery and including an electrode group, an electrolyte, a container for housing the electrode group and the electrolyte, and a safety valve operating in accordance with the internal pressure of the container. The working pressure of each safety valve is set so that the safety valve of at least one battery module is opened when the at least one battery module has its maximum internal pressure or less during the charge equalization. It is possible to provide a battery assembly that can improve the reliability of the container strength by keeping the working pressure of each safety valve lower than the pressure that the container resists even under elevated temperature conditions.

7 Claims, 5 Drawing Sheets

BATTERY ASSEMBLY

BACKGROUND OF THE INVENTION

1. Field of the Invention

The present invention relates to a battery assembly.

2. Description of the Related Art

Secondary batteries having a large capacity are employed in various applications where high energy and high power are required, such as vehicles, stationary batteries, or the like. In recent years, those batteries have been used as a main power source for driving electric motors in a pure electric vehicle (PEV) and a hybrid electric vehicle (HEV), which includes an engine and electric motor. With the growing need for protection of the global environment and for the effective utilization of energy resources, secondary batteries for PEVs/HEVs are expected to be in great demand in the future.

A battery assembly is used as a large-capacity secondary battery for a PEV/HEV driving power source. The battery assembly is built by connecting a plurality of battery modules, each of which includes two or more cells. The battery module is provided with a container that houses a plurality of electrode groups corresponding to the number of the cells and an electrolyte. The opening of the container is closed with a container cover. The container cover has a safety valve for releasing the gas in the container when the internal pressure of the container raises excessively.

In particular, a battery assembly used in HEVs is charged/discharged repeatedly in the range of 30 to 75% SOC (state of charge) during the normal driving of a vehicle. When the variation in the SOC between battery modules occurs with increasing running time of a vehicle, charge equalization is necessary at regular intervals to reduce the variation. The charge equalization usually is carried out so that the SOC of the battery assembly ranges from 100 to 120%. However, even in the charge equalization, the internal pressure of the battery modules to be charged may be increased. As shown in FIG. 5, a conventional battery assembly is provided with a safety valve whose working pressure is larger than the maximum internal pressure of the most highly charged battery module during the charge equalization, i.e., about 0.95 to 1.05 MPa.

As shown in FIG. 5, the maximum internal pressure of the most highly charged battery module during the charge equalization may be larger than the pressure that the container resists under elevated temperature conditions. However, a conventional battery assembly does not have a means for preventing a rise in the internal pressure during the charge equalization under elevated temperature conditions. Thus, it is possible that the container is deformed.

To solve the above problem, a method in which the pressure resistance of the individual containers is enhanced by increasing the thickness thereof is possible. However, a larger container thickness reduces the heat dissipation in battery modules, so that the battery temperature is apt to be raised, resulting in a vicious circle. In addition, the battery size, the cost, or the like is increased as well.

SUMMARY OF THE INVENTION

Therefore, with the foregoing in mind, it is an object of the present invention to provide a battery assembly that can improve the reliability of the strength of each container without increasing the thickness thereof.

As a result of the study on the relationship between the amount of the electrolyte that is released because of the operation of safety valves during the charge equalization and a set value of the working pressure of each safety valve, the present inventors have found out that maintaining the set value within a predetermined range can reduce the amount of the released electrolyte to a certain level or less, and that the battery characteristics are little affected.

To achieve the above object, a first battery assembly of the present invention includes a plurality of battery modules electrically connected together, each battery module acting as a secondary battery and including an electrode group, an electrolyte, a container for housing the electrode group and the electrolyte, and a safety valve operating in accordance with the internal pressure of the container. The working pressure of each safety valve is set so that the safety valve of at least one battery module is opened when the at least one battery module has its maximum internal pressure or less during the charge equalization.

The charge equalization can be carried out, e.g., so that the SOC of a battery assembly ranges from 100 to 120%. Here, "SOC" is the ratio of the amount of stored electricity to the rated capacity in percent.

This configuration allows the safety valve of at least one battery module to be opened during the charge equalization. Thus, a rise in the internal pressure of the container can be suppressed. Moreover, the working pressure of each safety valve can be lower than the pressure that the container resists even under elevated temperature conditions. Therefore, the reliability of the strength of each container can be improved without increasing the thickness thereof In the first battery assembly, it is preferable that the working pressure of each safety valve is set so that a change in the battery assembly weight after the charge equalization is 0.015 g or less per ampere-hour capacity. This preferred example can improve the reliability of the container strength and suppress the excessive degradation of the battery characteristics resulting from the reduced electrolyte during the charge equalization. Here, "a change in the battery assembly weight after the charge equalization" means a change in the battery assembly weight occurring for each charge equalization.

In the first battery assembly, it is preferable that the working pressure of each safety valve is set to 0.3 to 0.8 MPa under the temperature conditions of 20 to 60° C.

Next, a second battery assembly of the present invention includes a plurality of battery modules electrically connected together, each battery module acting as a secondary battery and including an electrode group, an electrolyte, a container for housing the electrode group and the electrolyte, and a safety valve operating in accordance with the internal pressure of the container. The amount of the electrolyte in the container is 1.3 to 8.0 g per ampere-hour capacity, and the working pressure of each safety valve is set to 0.3 to 0.8 MPa under the temperature conditions of 20 to 60° C.

This configuration allows the working pressure of each safety valve to be lower than the pressure that the container resists even under elevated temperature conditions. Thus, the reliability of the strength of each container can be improved without increasing the thickness thereof. In addition, since a sufficient amount of electrolyte is maintained, the excessive degradation of the battery characteristics can be suppressed.

In the first and the second battery assembly of the present invention, it is preferable that each battery module includes a plurality of cells electrically connected together.

In the first and the second battery assembly of the present invention, it is preferable that each battery module includes 2 to 10 cells.

It is preferable that the first and the second battery assembly of the present invention each include 20 to 50 battery modules.

It is preferable that the first and the second battery assembly of the present invention each have an energy density of 7.5 to 8.5 Wh/kg.

It is preferable that the first and the second battery assembly of the present invention each have a power density of 500 to 600 W/kg.

In the first and the second battery assembly of the present invention, it is preferable that each battery module includes a plurality of cells electrically connected together, and that the battery capacity of the battery assembly is 6.5 to 7.2 ampere-hour per cell.

The first and the second battery assembly of the present invention are suitable particularly for the driving power source of a vehicle because of the high reliability of the container strength under elevated temperature conditions.

As described above, a battery assembly of the present invention allows the safety valve of at least one battery module to be opened during the charge equalization. Thus, a rise in the internal pressure of the container can be suppressed. Therefore, the reliability of the strength of each container can be improved without increasing the thickness thereof.

These and other advantages of the present invention will become apparent to those skilled in the art upon reading and understanding the following detailed description with reference to the accompanying figures.

DESCRIPTION OF THE PREFERRED EMBODIMENTS

A battery assembly of the present invention includes a plurality of battery modules electrically connected together, each battery module acting as a secondary battery, such as a nickel-hydrogen battery. The number of the battery modules is not particularly limited, and it can be determined properly by the desired battery capacity or the like.

Figures 2A, 2B:
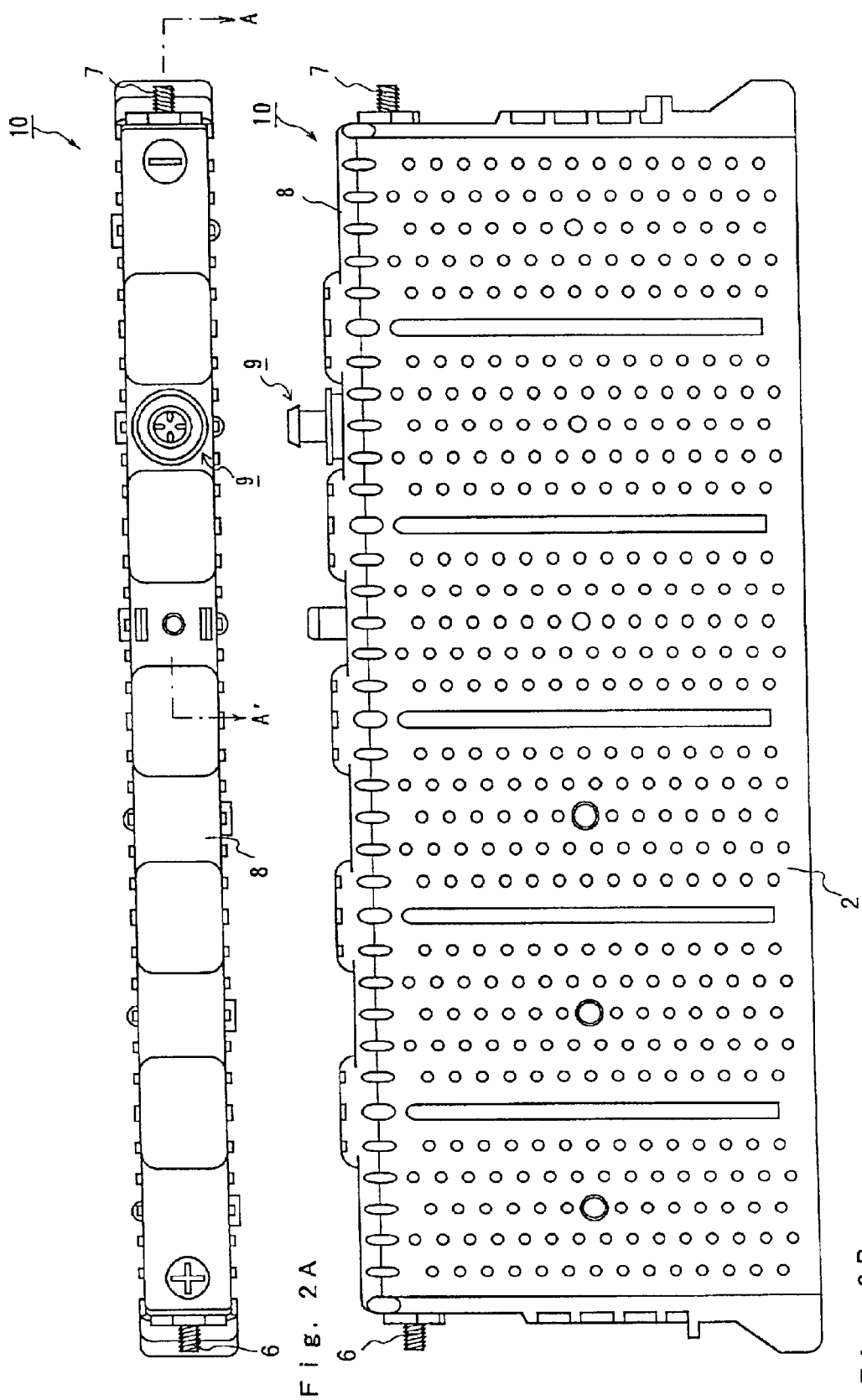
FIG. 2A is a plan view showing an example of one of the battery modules constituting a battery assembly of the present invention.
FIG. 2B is a front view showing the same.
Figure 3:
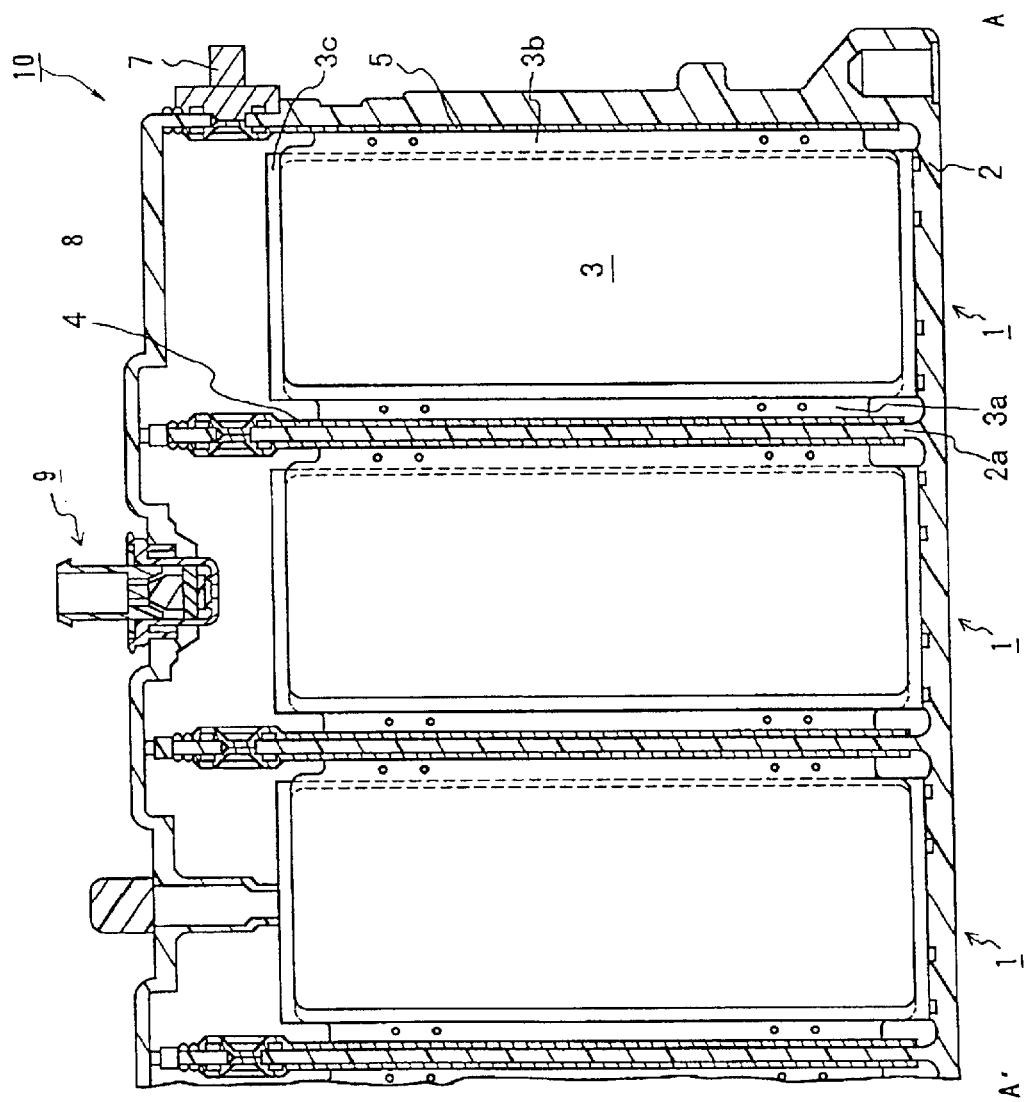
FIG. 3 is a cross-sectional view showing an example of one of the battery modules constituting a battery assembly of the present invention.

FIGS. 2A and 2B show an example of a configuration of a battery module. FIG. 2A is a plan view of the battery module and FIG. 2B is a front view of the same. FIG. 3 is a cross-sectional view taken on line A–A' of FIG. 2A.

A battery module 10 is provided with a container 2 that houses a plurality of cells 1 electrically connected together. The number of the cells 1 is not particularly limited, and it can be determined properly by the desired battery capacity or the like.

Each cell 1 includes an electrode group 3. In the electrode group 3, two or more positive plates 3a and negative plates 3b are disposed alternately via separators 3c. The positive plates 3a are connected electrically to each other with a positive electrode collector 4. Similarly, the negative plates 3b are connected electrically to each other with a negative electrode collector 5.

As the positive plate 3a, e.g., a porous substrate supporting nickel hydroxide is used. As the negative plate 3b, e.g., a porous substrate supporting $AB_5$ or $AB_2$ hydrogen storage alloys is used. Here, A represents a typical metal element and B represents a transition metal element. As the separator 3c, e.g., a porous film, non-woven fabric, textile, or the like is used. The separator 3c is made of, e.g., polyolefin, polyamide, or the like.

The electrode groups 3 and an electrolyte are housed in the container 2. As the electrolyte, e.g., an alkaline solution of potassium hydroxide, sodium hydroxide, lithium hydroxide, or the like is used. The amount of the electrolyte in the container is, e.g., 1.3 to 8.0 g, preferably, 3 to 6 g per ampere-hour capacity.

In the container 2, a plurality of cells 1 are separated by partitions 2a. The cells 1 are connected to each other in such a manner, e.g., that the positive electrode collector 4 and the negative electrode collector 5 of the adjacent cells are connected through a connection hole provided in the partition 2a. Also, the positive electrode collector 4 of the cell at one end of the battery module is connected electrically to the external positive terminal 6, while the negative electrode collector 5 of the cell at the other end of the battery module is connected electrically to the external negative terminal 7.

The container 2 can be formed, e.g., of a resin such as polypropylene. The shape of the container 2 is not particularly limited, and it can be, e.g., a square shape. Moreover, it is preferable that ribs are formed on the outer surface of the container 2 to improve heat dissipation.

The pressure resistance of the container 2 varies depending on temperature conditions. The container 2 resists pressures, e.g., of 1.2 MPa or more at room temperature (25° C.). Also, it resists pressures, e.g., of 0.7 MPa or more even at a temperature of 60° C.

The opening of the container 2 is closed with a container cover 8. The container cover 8 has a safety valve 9 that operates in accordance with the internal pressure of the container. There is no particular limitation to the structure of the safety valve 9, as long as the valve can be returned to its original state.

Figure 4:
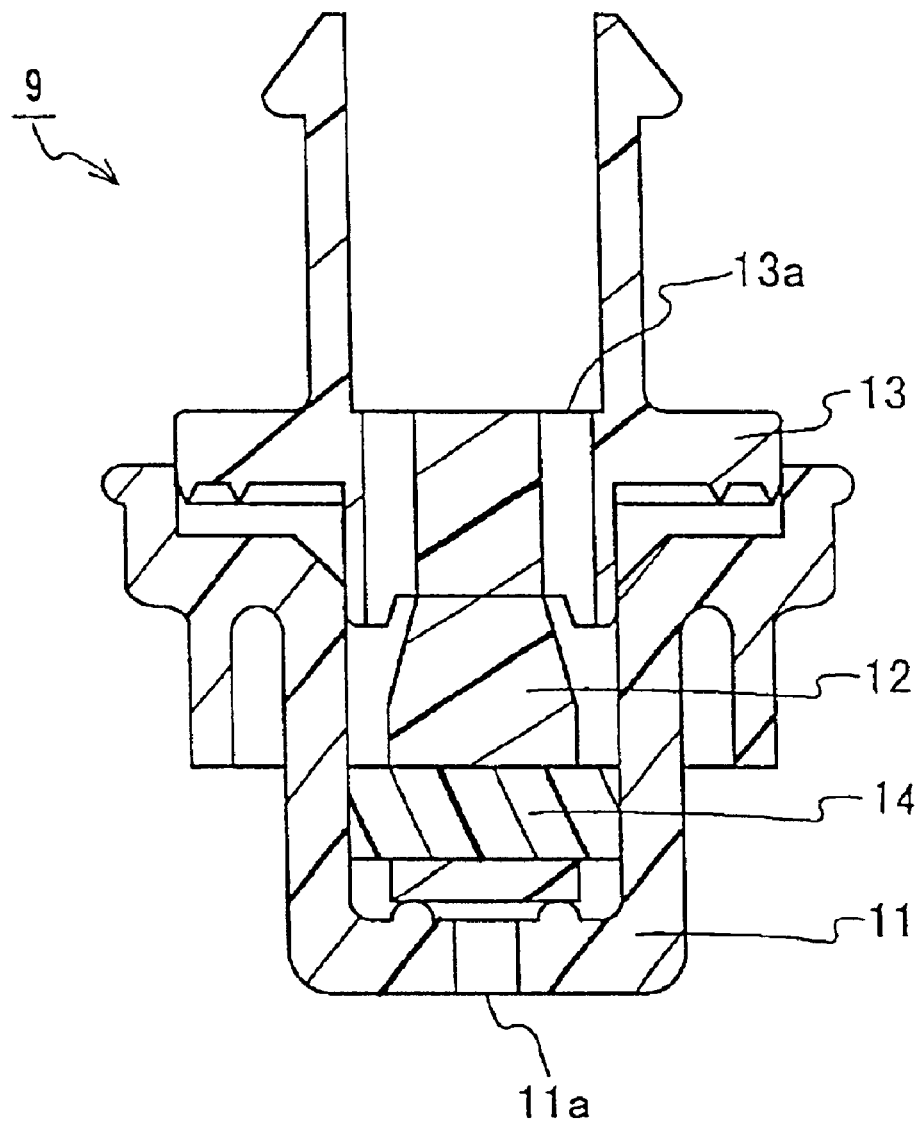
FIG. 4 is a cross-sectional view showing an example of a configuration of a safety valve.
Figure 5:
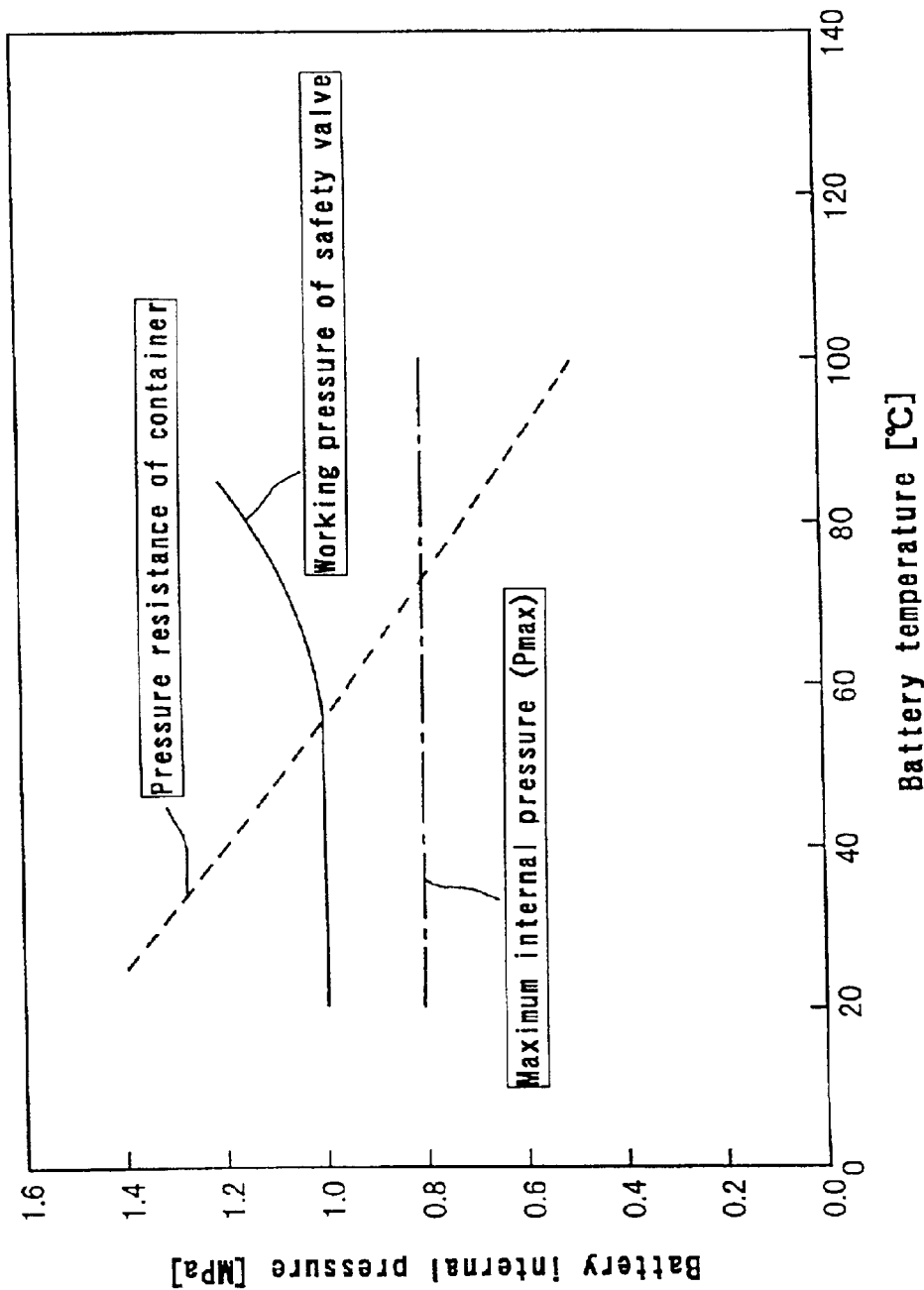
FIG. 5 shows an example of the relationship between the working pressure of a safety valve and the pressure resistance of a container in a conventional battery assembly.

As shown in FIG. 4, the safety valve 9 includes a valve seat 11 connected to the container cover, an elastic valve body 12 on the valve seat 11, and a cover 13 on the elastic valve body 12. The valve seat 11 has an air vent 11a in the bottom face thereof, the air vent communicating with the inside of the container. The elastic valve body 12 has a ring 14 for controlling its position. Thus, the elastic valve body 12 is positioned so as to close the air vent 11a in the valve seat 11, thereby sealing the container. The cover 13 has an outlet 13a.

The operation of the safety valve 9 will be described. First, when the internal pressure of the container is raised to exceed the working pressure of the safety valve, the elastic valve body 12 is compressed. Thus, the container is unsealed and the gas in the container is released from the outlet 13a. When the internal pressure of the container falls below the working pressure of the safety valve by the release, the elastic valve body 12 is returned to the state before being compressed. Thus, the container is sealed again, so that the gas flow is stopped.

Figure 1:
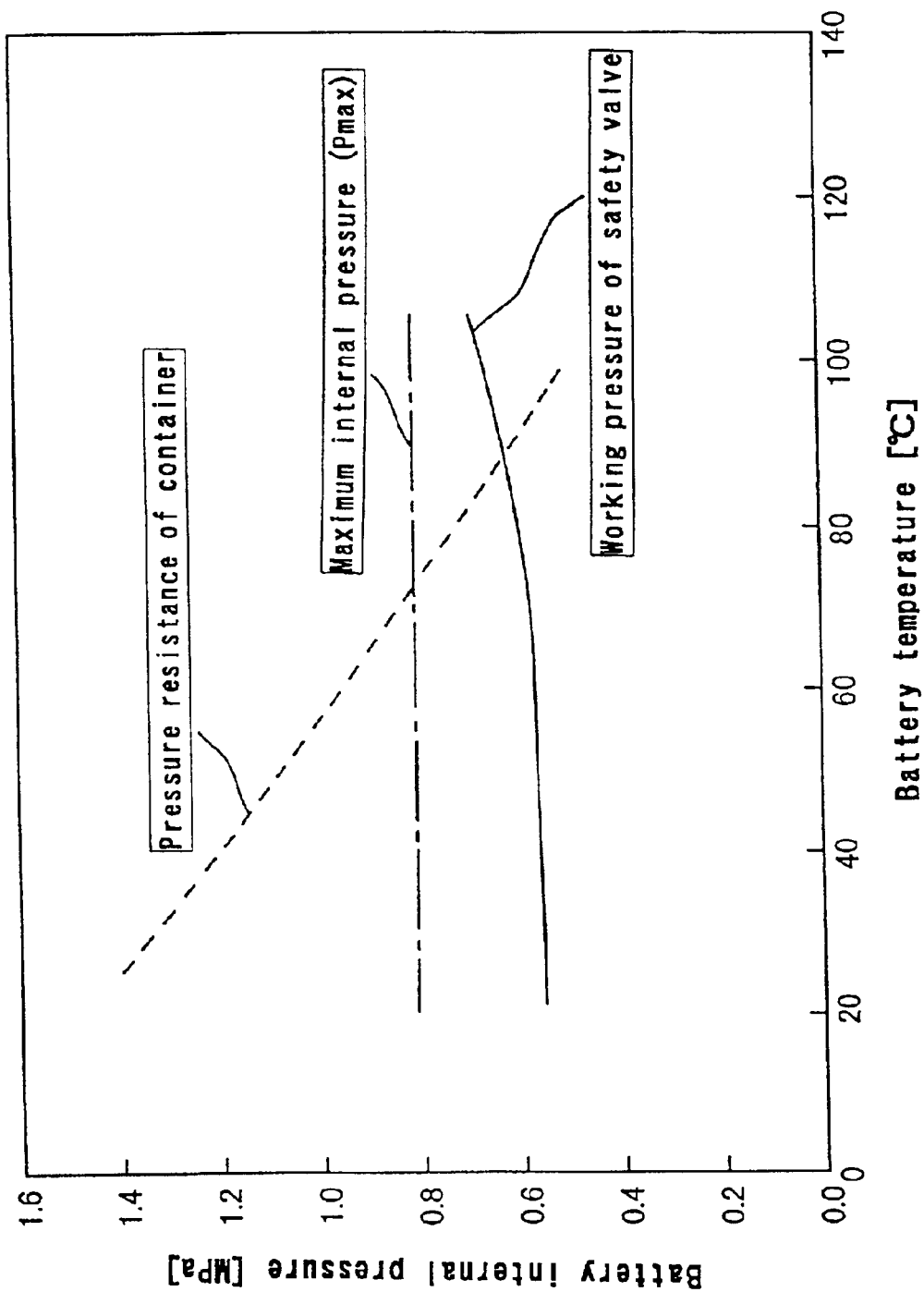
FIG. 1 shows an example of the relationship between the working pressure of a safety valve and the pressure resistance of a container in a battery assembly of the present invention.

All the safety valves of the battery modules in a battery assembly usually have the same working pressure. FIG. 1 shows an example of the relationship between the working pressure of a safety valve and the pressure resistance of a container in a battery assembly of the present invention.

In FIG. 1, the alternate long and short dashed line indicates an example of the maximum internal pressure of the battery module that is more highly charged than any other module in a battery assembly during the charge equalization without operating the safety valve (hereinafter, referred to as "maximum internal pressure (Pmax)").

There are some cases where the variation in the SOC between battery modules exceeds a given value during the life of a battery assembly. The charge equalization is necessary to reduce the variation. The charge equalization may be carried out on the condition that the SOC of each battery module is 100% or more. When this leads to overcharging, the internal pressure of each battery module is raised.

When the charge equalization is carried out without operating the safety valves, the most highly charged battery module has its maximum internal pressure, that is Pmax, e.g., of 0.8 to 0.9 MPa.

In a battery assembly of the present invention, the working pressure of each safety valve is set so that at least one of the safety valves is opened when the most highly charged battery module has its maximum internal pressure or before it reaches that point during the charge equalization. Therefore, the working pressure of each safety valve is lower than the maximum internal pressure (Pmax), as is indicated by the example shown in FIG. 1.

The difference between the working pressure of each safety valve and the maximum internal pressure (Pmax) varies depending on temperature conditions. For example, the difference is 0.2 to 0.5 MPa under the temperature conditions of at least 20 to 60° C.

As described above, in a battery assembly of the present invention, the working pressure of each safety valve is lower than the maximum internal pressure (Pmax). Thus, at least one of the safety valves is opened during the charge equalization, which may cause the release of the material in the container.

The lower limit of the working pressure of each safety valve can be determined, e.g., by the amount of material in the container that may be released to the outside during the charge equalization, in other words, by a reduction in the battery weight after the charge equalization. Specifically, the lower limit of the working pressure is set so that a reduction in the battery weight is, e.g., 0.015 g or less, preferably, 0.010 g or less per ampere-hour capacity. In this case, the lower limit of the amount of reduction is not particularly limited, as long as it is more than 0 g.

Based on the above description, the working pressure of each safety valve is, e.g., 0.3 to 0.8 MPa, preferably, 0.4 to 0.6 MPa in the temperature range of 20 to 60° C. Moreover, the working pressure is, e.g., 0.45 to 0.65 MPa in the temperature range of 60 to 85° C.

In a battery assembly of the present invention, the working pressure of each safety valve is lower than the maximum internal pressure (Pmax). Therefore, even under elevated temperature conditions, the working pressure of each safety valve can be lower than the pressure that the container resists. Specifically, the working pressure of each safety valve can be lower than the pressure that the container resists at temperatures, e.g., of 70° C. or less, preferably, 85° C. or less. As a result, the reliability of the strength of each container can be improved even under elevated temperature conditions.

For this reason, a battery assembly of the present invention is suitable for applications where the reliability of the container strength under elevated temperature conditions is particularly important, i.e., such applications that require a battery assembly composed of many battery modules. Specifically, it is suitable for the driving power source of a vehicle.

When used as the driving power source of a vehicle, a battery assembly of the present invention includes, e.g., 20 to 50 battery modules, preferably, 30 to 40 battery modules. Each of the battery modules includes, e.g., 2 to 10 cells, preferably, 4 to 8 cells.

Furthermore, when used as the driving power source of a vehicle, a battery assembly of the present invention preferably has an energy density of 7.5 to 8.5 Wh/kg. Also, it is preferable that the power density of the battery assembly is 500 to 600 W/kg. Moreover, the battery capacity is, e.g., 6.5 to 7.2 ampere-hour per cell.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A battery assembly comprising:
    a plurality of battery modules electrically connected together, each battery module acting as a secondary battery and comprising:
    a plurality of cells, each cell having an electrode group and an electrolyte,
    a single container in which the plurality of cells is housed, wherein the container comprises resin and each battery module includes partitions between the cells, and
    a single safety valve operating in accordance with an internal pressure of the container,
    wherein a working pressure of each safety valve is set so that the safety valve of at least one battery module is opened when the at least one battery module has its maximum internal pressure or less during charge equalization, and
    the working pressure of each safety valve is set so that a change in a battery assembly weight after the charge equalization is 0.015 g or less per ampere-hour capacity.

2. The battery assembly according to claim 1, wherein the working pressure of each safety valve is set to 0.3 to 0.8 MPa under temperature conditions of 20 to 60° C.

3. The battery assembly according to claim 1, wherein each battery module comprises a plurality of cells electrically connected together.

4. The battery assembly according to claim 3, wherein each battery module comprises 2 to 10 cells.

5. The battery assembly according to claim 1, comprising 20 to 50 battery modules.

6. The battery assembly according to claim 1, wherein each battery module comprises a plurality of cells electrically connected together, and a battery capacity of the battery assembly is 6.5 to 7.2 ampere-hour per cell.

7. The battery assembly according to claim 1, wherein the battery assembly is configured as a driving power source for a vehicle.

\* \* \* \* \*